April 28, 1970  A. MARZOCCHI  3,509,012
COMPOSITION AND COMPOUND FOR TREATMENT OF GLASS
FIBERS TO IMPROVE ELASTOMERIC BONDING
Filed Nov. 22, 1965
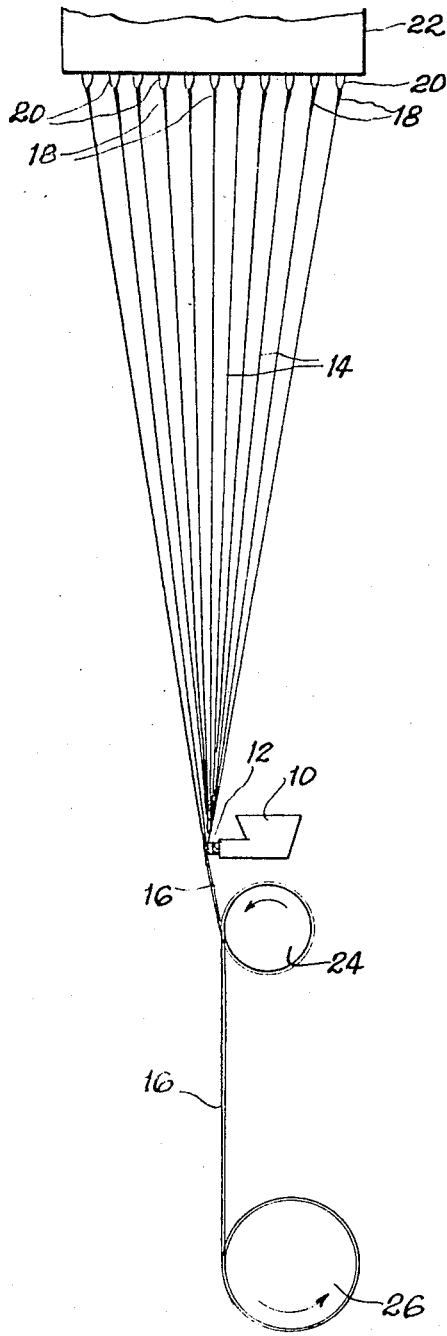
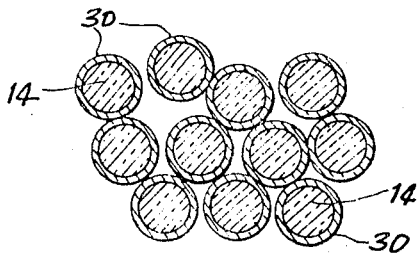
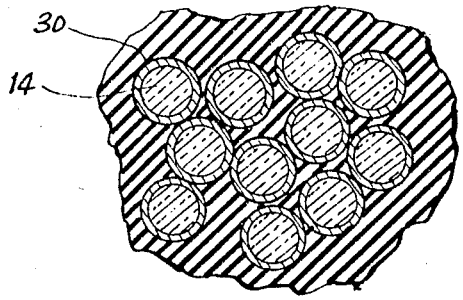
INVENTOR
Alfred Marzocchi
by Staelin and Overman
Attys

United States Patent Office 3,509,012
Patented Apr. 28, 1970

3,509,012
COMPOSITION AND COMPOUND FOR TREATMENT OF GLASS FIBERS TO IMPROVE ELASTOMERIC BONDING
Alfred Marzocchi, Cumberland, R.I., assignor to Owens-Corning Fiberglas Corporation, a corporation of Delaware
Filed Nov. 22, 1965, Ser. No. 508,931
Int. Cl. D04h 1/00
U.S. Cl. 161—170          5 Claims

ABSTRACT OF THE DISCLOSURE

A glass fiber reinforced elastomeric product in which the bonded relationship between the glass fiber surfaces and the elastomeric material is enhanced by a coating on the glass fiber surfaces containing an amino silanized alkylene oxide condensate.

---

This invention relates to glass fiber-elastomeric systems and it realtes more particularly to a new and improved compound and composition for use in the treatment of glass fibers to enhance their bonding relationship with elastomeric materials with which the glass fibers are combined in the manufacture of glass fiber-elastomeric products.

For fullest utilization of the high strength and other properties characteristic of glass fibers, in the glass fiber-elastomeric product, it is desirable to provide for the establishment of a strong and permanent bonded relationship between the surfaces of the glass fibers and the elastomeric material. This is difficult to achieve with glass fibers because such fibers, when formed by the rapid attenuation of molten streams of glass, constitute solid, rod-like members having perfectly smooth surfaces. As a result, there is little onto which the elastomeric material can grab for physical attachment to the glass fibers.

The use of chemical forces is equally unavailable since the groupings that predominate on the glass fiber surfaces are hydrophilic in character. As a result, a moisture film forms almost instantly and is retained tenaciously on the glass fiber surfaces or the water film otherwise forms thereon in the presence of moisture or high humidity to weaken any bond that might have been established between the glass fibers and the elastomeric material.

In the plastics art, utilization has been made of anchoring agents for modification of the glass fiber surfaces to render them more receptive to the synthetic resinous materials. The selection of the anchoring agent has depended greatly on the type of resinous material with which the glass fibers were to be combined. For example, treatment to coat the glass fibers with an ethylenically unsaturated organo silicon compound, such as vinyltrichloro silane, or a Werner complex compound, such as methacrylato chromic chloride, was found to be suitable for the combination of glass fibers with resinous materials formed by addition polymerization but not with resinous materials formed by condensation polymerization, as with the phenolics, urea formaldehyde or polyamide resins. On the other hand, treatment of the glass fibers to coat the fibers with an organo silane or Werner complex compound containing an amino group, epoxy group or carboxyl group in the organic group attached to the silicon atom or in the carboxylato group of the Werner complex was satisfactory for resinous materials formed by condensation polymerization but not for resinous materials formed by addition polymerization.

With rubber, a completely different set of conditions is presented since the elastomeric molecule does not find its relationship either in the condensation polymerization resins or in the addition polymerization resins. Further, the reaction for vulcanization or cure of the rubber differs completely from the processes of addition polymerization or condensation polymerization of resinous materials. Thus the resinous systems have been incapable of offering a solution to the problem unique to the establishment of a strong and permanent bonded relationship between the surfaces of glass fibers and elastomeric materials with which the glass fibers are combined in the manufacture of cured or vulcanized glass fiber-elastomeric products.

In order to use the glass fibers as a reinforcement or the like with elastomeric materials, it has been desirable to process the individual filaments of glass fibers into glass fiber bundles, such as yarns, strands, cords, fabrics and the like. For this purpose, it was necessary to coat the glass fibers immediately after forming with a glass fiber size composition embodying a desired balance between lubricity and bonding to enable relative movements between the fibers without destruction of the fibers by mutual abrasion during processing of the glass fibers into strands, yarns, cords or fabrics. When use is made of an anchoring agent to enhance the performance characteristics of the glass fibers, as in the establishment of a strong and permanent bonded relationship between the glass fibers and the polymeric material, it is desirable to remove the original size from the glass fiber surfaces after processing for replacement with the anchoring agent since it has been found to be insufficient to incorporate the anchoring agent as a part of the glass fiber size. This results in the utilization of an excessive amount of material, labor, equipment and space, such that it would be desirable to be able to formulate a single composition which could be applied to provide both the desired processing characteristics and performance characteristics so that only one application need be made in the treatment of the glass fibers without the need for removal of the coating from the processed fibers for replacement with an anchoring agent.

Thus it is an object of this invention to produce a new and improved glass fiber system in which the fibers are treated to provide a coating on the glass fiber surfaces which enhances the bonded relationship between the glass fiber surfaces and elastomeric materials with which the glass fibers are combined in the manufacture of glass fiber-elastomeric products, and it is a related object to produce a new and improved compound and composition for use in the practice of same.

Another object is to produce a new and improved compound and composition which may be applied to glass fibers as a size coating to permit processing of the glass fibers to the form desired for use in the combination with the elastomeric material and which operates also to enhance the performance characteristics of the coated glass fibers in the establishment of a strong and permanent bonded relationship with the elastomer thereby to provide a single size composition which embodies both the desired performance and processing characteristics to enable the size to remain on the glass fiber surfaces after processing of the glass fibers for combination with the elastomeric material.

These and other objects and advantages of this invention will hereinafter appear and for purposes of illustration, but not of limitation, an embodiment of the invention is shown in the accompanying drawing, in which—

FIG. 1 is a schematic elevational view of a glass fiber forming and treating system which may be employed in the practice of this invention;

FIG. 2 is an enlarged sectional view of a glass fiber coated in accordance with the practice of this invention;

FIG. 3 is an enlarged sectional view of a fragmentary portion of a glass fiber bundle formed of the glass fibers of FIG. 2; and FIG. 4 is an enlarged sectional view of a fragmentary portion of a glass fiber-elastomeric product produced in accordance with the practice of this invention.

It has been found, in accordance with the practice of this invention, that the desired processing and performance characteristics for combination of the glass fibers with an elastomeric material in the manufacture of a cured or vulcanized glass fiber-elastomeric product can be achieved with a single composition when the glass fibers are treated to coat the fibers with a composition containing a silanized ethylene oxide condensate having amino groups such as can be formed by the reaction of an amino silane with an epoxide in which the epoxide is preferably a diepoxide or polyepoxide such as polyethylene or polypropylene glycol epoxide or diepoxide, as can be formed by the reaction of polyethylene glycol or polypropylene glycol with epichlorohydrin.

The amino silane reacted with the epoxide to form the silanized ethylene oxide condensate can be represented by the formula $R_nSiX_{(4-n)}$ in which X is a highly hydrolyzable group such as a halogen of the type chlorine, bromine or fluorine, or a short chained alkoxy group such as methoxy, ethoxy, propoxy and the like, and R is an organic group preferably having a length less than 8 carbon atoms and containing an amino group or a group capable of acting as a free amine. Representative are such amino silanes as gamma-aminopropyltriethoxy silane, gamma-aminovinyldiethoxy silane, gamma(triethoxysilylpropylamide) propylamine, N(gamma - triethoxysilylpropyl) propylamine, $\beta$-aminoallyltriethoxy silane, para - aminophenoltriethoxy silane, and the like.

The described compound is of a sufficient viscosity to function as a film former or to protect the glass fibers against destruction from mutual abrasion and it also permits sufficient relative movement between the fibers to enable the compound to be embodied in a composition applied as an original size to the glass fiber surfaces whereby the sized glass fibers can be processed into the desired bundle arrangement for combination with the elastomeric material.

At the same time, the described compound with which the glass fibers are treated provides a number of sites which can operate to enhance the bonded relationship between the treated glass fiber surfaces and the cured or vulcanized elastomeric material. Strong and permanent attachment of the formed compound to the glass fiber surfaces is achieved through the occasional silicon linkage which constitutes a part of the formed compound. The amino group is capable of functioning in the compound as a vulcanizing agent and/or as a sulphur accelerator thereby to enhance the cure or vulcanization of the elastomer and to react therein in a manner to tie in the cured or vulcanized elastomer with the glass fiber surfaces. The amine groups are also capable of addition across the double bond of the elastomer to form a primary amine therebetween. The nitrogen group finds reaction with the sulphur during vulcanization with the splitting off of hydrogen sulfide. There is evidence also that the elastomer contains organic acids as impurities which are amidized in the presence of the amine groups of the compound to achieve a still further tie-in.

The glycol portion of the condensate appears to operate in a manner to solubilize the compound with the elastomer whereby the compound which is tied through the silicon atoms to the glass fiber surfaces is capable of becoming blended with the cured or vulcanized elastomer thereby completely to tie in the glass fibers with the elastomeric system. Free epoxides or oxirane rings in the formed compound are capable of condensation with the sulphur during vulcanization to tie in with the elastomer via the vulcanization agent or the diepoxide thereby to provide further sites for anchorage of the elastomeric material with the glass fiber surfaces.

The following are given by way of illustration, but not by way of limitation, of the reaction for preparation of the amino silanized ethylene oxide condensate representative of the practice of this invention.

EXAMPLE 1

Preparation of polyethylene glycol epoxide:

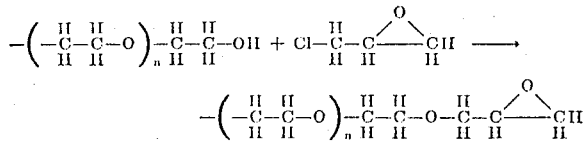

EXAMPLE 2

Preparation of polyethylene glycol diepoxide:

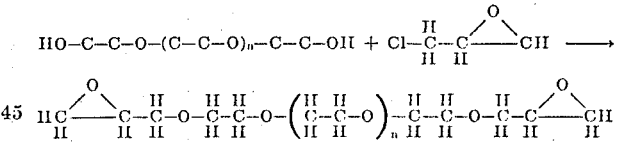

A monomer of this character is marketed presently by Ciba Co. under the name R-D-2.

EXAMPLE 3

Preparation of silanized polyethylene glycol epoxide:

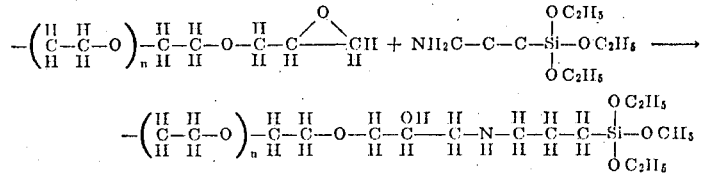

EXAMPLE 4

Preparation of amino silanized polyethylene glycol diepoxide:

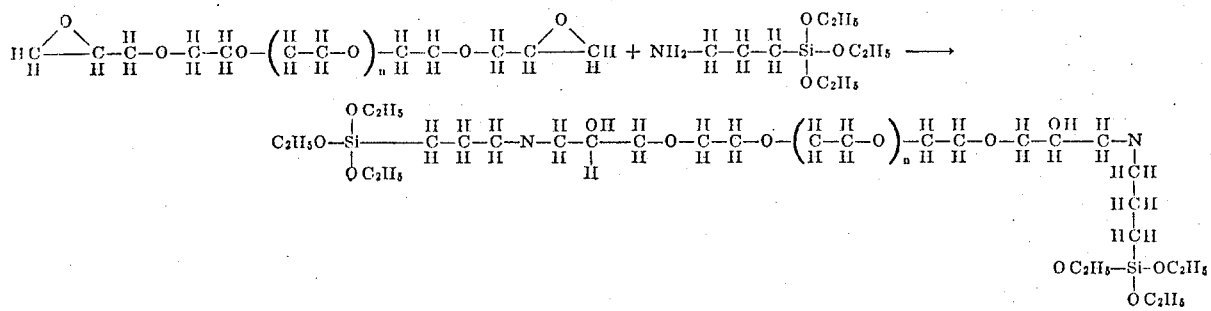

It will be understood that the epoxide can be of variable carbon length depending upon the number of glycol monomers that have been combined and it will be understood further that the glycol can be propylene glycol or ethylene glycol or mixtures thereof. It will be understood also that the amino silane can be any other amino or diamino silane in which the carbon length of the organic group attached to the silicon atom preferably contains not more than 8 carbon atoms although amino silanes of higher carbon length can be used.

In the reaction of Example 1, the chloro-oxirane reactant can be replaced with epichlorohydrin for reaction. Also, in the reaction of the amino silane with a polyepoxide, such as the diepoxide of Example 4, the silane can be reacted with only one of the oxirane groups leaving the other or others free for reaction after coating the glass fibers with the reaction product.

The resulting silanized ethylene oxide condensate can be used alone on the glass fiber surfaces as an anchoring agent to bond the glass fibers and the elastomeric material in the glass fiber-elastomeric product. It can be used alone or in combination with other materials as the principal component in a size composition applied to the glass fiber surfaces in forming but for such purposes, it is desirable to make use of a polyethylene glycol or polypropylene glycol having a molecular weight sufficient to impart protective film forming characteristics to enable the processing of the sized glass fibers. For this purpose, it is desirable to make use of a polyethylene glycol or polyethylene glycol component having a molecular weight of at least 200 and preferably having a molecular weight average within the range of 300 to 600.

When used as a size, the silanized ethylene oxide condensate can be formulated with a lubricant such as stearic acid or other long chained fatty acid or salt thereof present in an amount within the range of .1 to 2 percent by weight of the size composition.

A size composition embodying the anchoring agent of this invention can be formulated to include other compatible film forming resinous materials or elastomers such as butadiene-styrene copolymer (C-oil), and the like.

EXAMPLE 5

| | Parts by weight |
|---|---|
| Silanized diepoxide of Example 4 in which the polyethylene glycol has a molecular weight average of 300 | 10 |
| Water | 89.8 |
| Emulsifying agent | 0.2 |

EXAMPLE 6

| | Parts by weight |
|---|---|
| Silanized epoxide of Example 3 in which the polyethylene glycol has a molecular weight average of 500 | 12 |
| Stearic acid | 0.2 |
| Water | 87.6 |
| Emulsifying agent | 0.2 |

EXAMPLE 7

| | Parts by weight |
|---|---|
| Silanized epoxide of Example 3 formed of the diepoxide of polypropylene glycol having a molecular weight average of 400 | 8 |
| Butadiene-styrene copolymer | 4 |
| Water | 87.7 |
| Emulsifying agent | .3 |

The composition of Example 5 can be used either as a size or as an anchoring agent applied directly onto the glass fiber surfaces in forming or after the original size has been removed.

In Example 6, the emulsifying agent can be replaced with ammonia which can then react with the stearic acid to form the corresponding stearic acid salt which is capable of emulsification. Similarly the stearic acid component can be substituted with other organic acids such as acetic acid, propionic acid, butyric acid, palmitic acid, which form an emulsifiable salt with ammonia.

Examples 6 and 7 can be used as a forming size applied to the glass fiber surfaces. With reference to FIG. 1, the glass fiber size composition of Example 5, 6 or 7 is used in a container 10 for continuously wetting an applicator pad 12 over which the attenuated glass fibers 14 are continuously drawn as the fiber filaments are gathered together into a strand 16. The glass fiber filaments are formed by rapid attenuation of molten streams 18 of glass issuing from hundreds of separate nozzles 20 in the bottom side of a glass melting bushing 22. Attenuation or stretching of the molten streams of glass is effected by a rapidly rotating wheel puller 24 which feeds the sized yarn onto a winding spool 26.

The size composition forms a thin coating 30 on the surfaces of the individual glass fiber filaments 14 which, when gathered together to form the strand or the glass fiber bundle, more or less uniformly distributes the coating throughout the cross-section of the bundle, as illustrated in FIG. 3.

The bundle of glass fibers and yarns, cords or fabrics formed thereof can be cut into shorter lengths and compounded with an uncured elastometric material to form a molding compound having the fibers substantially uniformly distributed therein and which can be cured or vulcanized under heat and pressure to form the final shaped products. Instead, the strands, yarns, cords or fabrics can be laid down with the elastomer material, while the latter is in an uncured stage, for subsequent molding under heat and pressure for cure or vulcanization of the elastomer in forming the final product such as a belt, tire, or the like, in which the glass fiber component can be selectively arranged to extend in the lengthwise or crosswise direction in the belt or to extend radially, as in a radially wound tire, or to extend on the bias in a conventional bias wound tire.

As used herein, the term "elastomer" is meant to include natural rubber and derivatives thereof and synthetic rubbers such as polyisoprene, neoprene, chlorobutyl rubber, butadiene-acrylonitrile rubber, butadiene rubber, butadiene-styrene rubber, and the like. Such rubbers are formulated with suitable fillers such as carbon black, zinc oxide and the like and a curing agent such as peroxide or a vulcanizing agent such as sulphur, and a sulphur accelerator in compounding with the glass fibers in the manufacture of a cured or vulcanized glass fiber-elastomeric product by conventional molding under heat and pressure.

As used herein, the term "glass fibers" is meant to include continuous fibers fabricated by the rapid attenuation of molten streams of glass, as illustrated in FIG. 1, and staple or discontinuous glass fibers in which molten streams of glass issuing from the bottom side of a glass melting bushing are attenuated by high pressure streams of air or steam directed angularly downwardly onto the streams of molten glass to stretch the streams into fine discontinuous filaments. The filaments are allowed to fall down, with or without air as a carrier, for collection onto the surfaces of a foraminous rotating drum from which they are gathered to form an endless sliver which is drafted into a yarn. In the continuous fiber forming process, the treating composition is applied to the glass fiber surfaces by spraying onto the fibers as they are formed and fall downwardly onto the drum or as they are gathered together on the drum.

It will be understood that changes may be made in the formulation and method of application without departing from the spirit of the invention, especially as defined in the following claims.

I claim:
1. A cured elastomeric product having glass fibers embedded therein in the form of glass fiber bundles in which the individual glass fibers of the bundle and elastomer are bonded one to another through a coating on the glass fiber surfaces the essential component of which consists of an amino silanized alkylene oxide condensate formed by the reaction of an amino silane and an epoxide of a lower alkylene oxide condensate.

2. An elastomeric product as claimed in claim 1 in which the amino silane is gamma-aminopropyltriethoxy silane.

3. An elastomeric product as claimed in claim 1 in which the lower alkylene oxide is selected from the group consisting of ethylene glycol and propylene glycol.

4. An elastomeric product as claimed in claim 1 in which the epoxide is a diepoxide.

5. An elastomeric product as claimed in claim 1 which includes a glass fiber lubricant in combination with the reaction product.

References Cited

UNITED STATES PATENTS

| | | | |
|---|---|---|---|
| 3,062,242 | 11/1962 | Vanderbilt | 161—193 |
| 3,239,580 | 3/1966 | Pendleton et al. | |
| 3,249,412 | 5/1966 | Kolek et al. | 161—193 |
| 3,281,491 | 10/1966 | Smith et al. | |
| 3,297,186 | 1/1967 | Wells | 161—185 |
| 3,299,166 | 1/1967 | Emblem et al. | |

MORRIS SUSSMAN, Primary Examiner

U.S. Cl. X.R.

117—126, 161; 156—166; 161—185